US007874817B2

(12) United States Patent
Gettel et al.

(10) Patent No.: US 7,874,817 B2
(45) Date of Patent: Jan. 25, 2011

(54) FUEL PUMP ASSEMBLY WITH A VAPOR PURGE PASSAGE ARRANGEMENT FOR A FUEL PUMP MODULE

(75) Inventors: Bryan J. Gettel, Greeneville, TN (US); Peter P. Kuperus, Cass City, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 201 days.

(21) Appl. No.: 11/756,980

(22) Filed: Jun. 1, 2007

(65) Prior Publication Data

US 2008/0298985 A1    Dec. 4, 2008

(51) Int. Cl.
*F04D 13/08*    (2006.01)
*F04D 29/58*    (2006.01)

(52) U.S. Cl. ............ 417/423.3; 417/423.7; 417/423.14; 417/369; 310/87; 310/233; 210/416.4

(58) Field of Classification Search .............. 417/423.7, 417/307, 366, 369, 76, 84, 88, 89, 423.3, 417/423.14; 310/87, 233; 210/416.4
See application file for complete search history.

(56) References Cited

U.S. PATENT DOCUMENTS

| 2,394,860 | A | * | 2/1946 | Korte .......................... 417/369 |
| 2,468,187 | A | * | 4/1949 | Ericson ....................... 417/369 |
| 3,090,318 | A | * | 5/1963 | Jeep, Jr. et al. ............ 417/423.7 |
| 3,270,230 | A | * | 8/1966 | Schultz ....................... 310/239 |
| 3,294,025 | A | * | 12/1966 | Niemeyer et al. ........ 210/416.4 |
| 3,877,845 | A | * | 4/1975 | Green et al. ............. 417/423.7 |
| 4,295,797 | A | * | 10/1981 | Ruhl et al. ................... 417/203 |
| 4,822,258 | A | * | 4/1989 | Matsuda et al. .......... 417/423.3 |
| 4,974,570 | A | * | 12/1990 | Szwargulski et al. ........ 123/509 |
| 5,039,284 | A | * | 8/1991 | Talaski ........................ 417/366 |
| 5,053,664 | A | * | 10/1991 | Kikuta et al. ............... 310/114 |
| 5,149,252 | A | * | 9/1992 | Tuckey et al. ............... 417/205 |
| 5,360,322 | A | * | 11/1994 | Henein et al. ............... 417/313 |
| 5,392,750 | A | * | 2/1995 | Laue et al. ................... 123/509 |
| 5,399,075 | A | * | 3/1995 | Frank et al. ............. 417/423.1 |
| 5,511,957 | A | * | 4/1996 | Tuckey et al. ............... 417/313 |
| 5,525,048 | A | * | 6/1996 | Tuckey .................. 417/423.15 |
| 5,630,399 | A | * | 5/1997 | Nomura et al. ............. 123/467 |
| 5,655,892 | A | * | 8/1997 | Cherniawski et al. ....... 417/292 |
| 5,980,221 | A | * | 11/1999 | Uffelman .................... 417/540 |
| 6,068,456 | A | * | 5/2000 | Tuckey et al. ............ 417/423.3 |
| 6,073,614 | A | * | 6/2000 | Kleppner .................... 123/509 |
| 6,158,975 | A | * | 12/2000 | Dill et al. .................... 417/307 |
| 6,196,200 | B1 | * | 3/2001 | Roche ........................ 123/509 |
| 6,227,819 | B1 | * | 5/2001 | Gettel et al. ............. 417/423.1 |
| 6,231,318 | B1 | * | 5/2001 | Cotton et al. ............ 417/423.1 |
| 6,302,144 | B1 | * | 10/2001 | Graham et al. ......... 137/565.17 |
| 6,547,515 | B2 | * | 4/2003 | Ross ........................ 415/55.1 |
| 6,659,713 | B1 | * | 12/2003 | Fujii et al. ................ 415/55.1 |
| 6,823,831 | B2 | * | 11/2004 | Chu et al. ............... 123/198 D |
| 6,824,361 | B2 | * | 11/2004 | Yu et al. ..................... 416/203 |
| 7,057,318 | B2 | * | 6/2006 | Strobl et al. .................. 310/90 |
| 7,179,066 | B2 | * | 2/2007 | Good et al. ............ 417/423.14 |

(Continued)

*Primary Examiner*—Devon C Kramer
*Assistant Examiner*—Nathan Zollinger
(74) *Attorney, Agent, or Firm*—Reising Ethington P.C.

(57) ABSTRACT

A fuel pump assembly includes a fuel pump, and an electric motor for rotatably driving the fuel pump and including a motor armature and a commutator positioned between the motor armature and the fuel pump.

18 Claims, 5 Drawing Sheets

U.S. PATENT DOCUMENTS

| | | | |
|---|---|---|---|
| 7,442,015 B2 * | 10/2008 | Oi et al. | 417/423.3 |
| 2002/0090292 A1 * | 7/2002 | Ross | 415/55.1 |
| 2002/0185114 A1 * | 12/2002 | Chu et al. | 123/497 |
| 2003/0121865 A1 * | 7/2003 | Winn et al. | 210/739 |
| 2003/0173925 A1 * | 9/2003 | Strobl et al. | 318/543 |
| 2006/0024176 A1 * | 2/2006 | Ikeya | 417/366 |
| 2006/0088426 A1 | 4/2006 | Gottschalk et al. | |
| 2006/0207573 A1 * | 9/2006 | Douyama et al. | 123/509 |
| 2006/0275163 A1 * | 12/2006 | Pike | 417/423.9 |
| 2008/0107549 A1 * | 5/2008 | Crary et al. | 417/410.1 |
| 2008/0298985 A1 * | 12/2008 | Gettel et al. | 417/410.1 |

* cited by examiner

FUEL PUMP ASSEMBLY WITH A VAPOR PURGE PASSAGE ARRANGEMENT FOR A FUEL PUMP MODULE

FIELD OF THE INVENTION

The present invention relates generally to fuel pump modules for placement in fuel tanks and more particularly to fuel pump assemblies.

BACKGROUND OF THE INVENTION

In-tank fuel pump modules are used in automotive fuel delivery systems to draw fuel from a fuel tank and supply the fuel under pressure for delivery to an engine. These modules usually include a mounting flange closing an opening in an upper wall of the tank, a fuel reservoir carried by the mounting flange and disposed within the fuel tank, a fuel pump assembly disposed in the reservoir, and several hoses and hose interconnections between and among the mounting flange, fuel reservoir, and fuel pump assembly.

In conventional electric motor driven fuel pump assemblies, a pump discharges fuel through a motor housing to cool the motor as the fuel flows past the motor and out of the pump outlet. Such assemblies experience a high viscous drag because the armature is spinning in a liquid such as gasoline or diesel fuel rather than air. As the viscous drag increases, more motor torque is required to overcome that drag. Thus, more power is required to spin the armature in a liquid than in a gas. This is frequently referred to as windage losses. Such windage losses limit the efficiency of such assemblies.

Moreover, automobile designers find it increasingly desirable to package fuel tanks in vertically confined spaces such as underneath a rear seat of a vehicle. But, current fuel pump modules are axially too tall to be packaged in such a location. Accordingly, in-tank fuel pump modules are typically modified to accommodate various requirements peculiar to different vehicle applications. But this approach generally requires extensive retooling to provide a compatible design for each separate vehicle application.

SUMMARY OF THE INVENTION

A fuel pump assembly according to one implementation includes a fuel pump, and an electric motor for rotatably driving the fuel pump, and including a motor armature, and a commutator positioned between the motor armature and the fuel pump. The commutator position may facilitate cooling and cleaning of the commutator. The fuel pump assembly may further include a fuel inlet and outlet disposed at a pump end of the assembly to reduce or eliminate related hoses, hose routing, and hose interconnections.

According to another implementation, a reservoir assembly for a fuel pump module includes a reservoir including a pump pocket configured to receive a fuel pump assembly and at least partially defined by an inside bottom surface. The reservoir assembly further includes a fuel pump inlet passage and a fuel pump outlet passage disposed in the inside bottom surface. The inlet and outlet passages may be adapted for fluid communication with a pump inlet and outlet of the fuel pump assembly. The reservoir may also include an inlet pocket disposed in an end wall of the reservoir between the inside bottom surface and an outside bottom surface of the end wall and in open communication with the outside bottom surface to allow fuel to enter the inlet pocket. The reservoir may further include a reservoir inlet passage disposed in the end wall and in fluid communication with the inlet pocket and the reservoir chamber, and a reservoir outlet passage disposed in the end wall and carrying a jet in fluid communication with the inlet pocket and directed toward the reservoir inlet passage.

According to an implementation of a fuel pump module, the module includes the aforementioned fuel pump and reservoir assemblies, and at least a portion of the fuel pump assembly is carried within the pump pocket of the reservoir.

At least some of the objects, features and advantages that may be achieved by at least certain embodiments of the invention include a fuel pump assembly that is readily adaptable to various fuel pump modules, fuel tanks, and vehicle applications; routes pressurized fuel away from an electric motor portion of the assembly; reduces or eliminates pump flow-through losses; increases fuel pumping efficiency; decreases heat transferred to the fuel before it is discharged from the fuel pump assembly; improves venting of fuel vapor from the fuel pump; lowers electric current draw of the fuel pump; reduces or eliminates costly and labor intensive hoses, hose routings, and hose interconnections; simplifies assembly; removes build up of commutator brush debris; allows for a reduction in axial height of a fuel pump module compared to prior art designs; enables relatively low motor speed in combination with low motor chamber pressure to reduce viscous motor torque losses; facilitates purge porting to reduce pump flow losses; and is of relatively simple design, economical manufacture and assembly, rugged, durable, reliable, and in service has a long useful life.

Of course, other objects, features and advantages will be apparent in view of this disclosure to those skilled in the art. Various other fuel pump and filter assemblies and/or fuel pump modules embodying the invention may achieve more or less than the noted objects, features or advantages.

BRIEF DESCRIPTION OF THE DRAWINGS

These and other objects, features and advantages of the present invention will be apparent from the following detailed description of preferred embodiments and best mode, appended claims, and accompanying drawings in which:

DETAILED DESCRIPTION OF PREFERRED EMBODIMENTS

Figure 1:
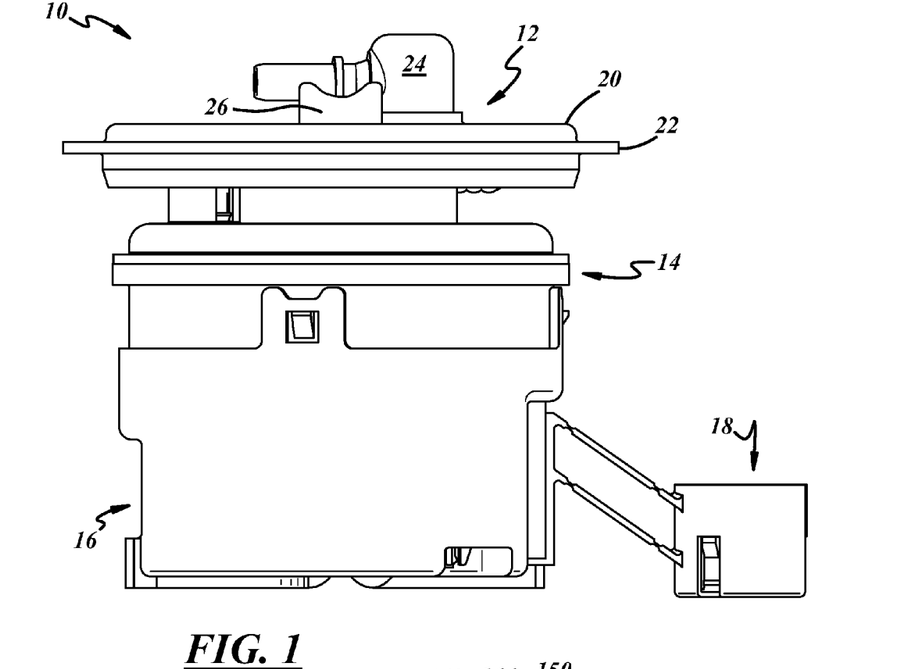
FIG. 1 is an elevational view of a presently preferred form of a fuel pump module.
Figure 2:
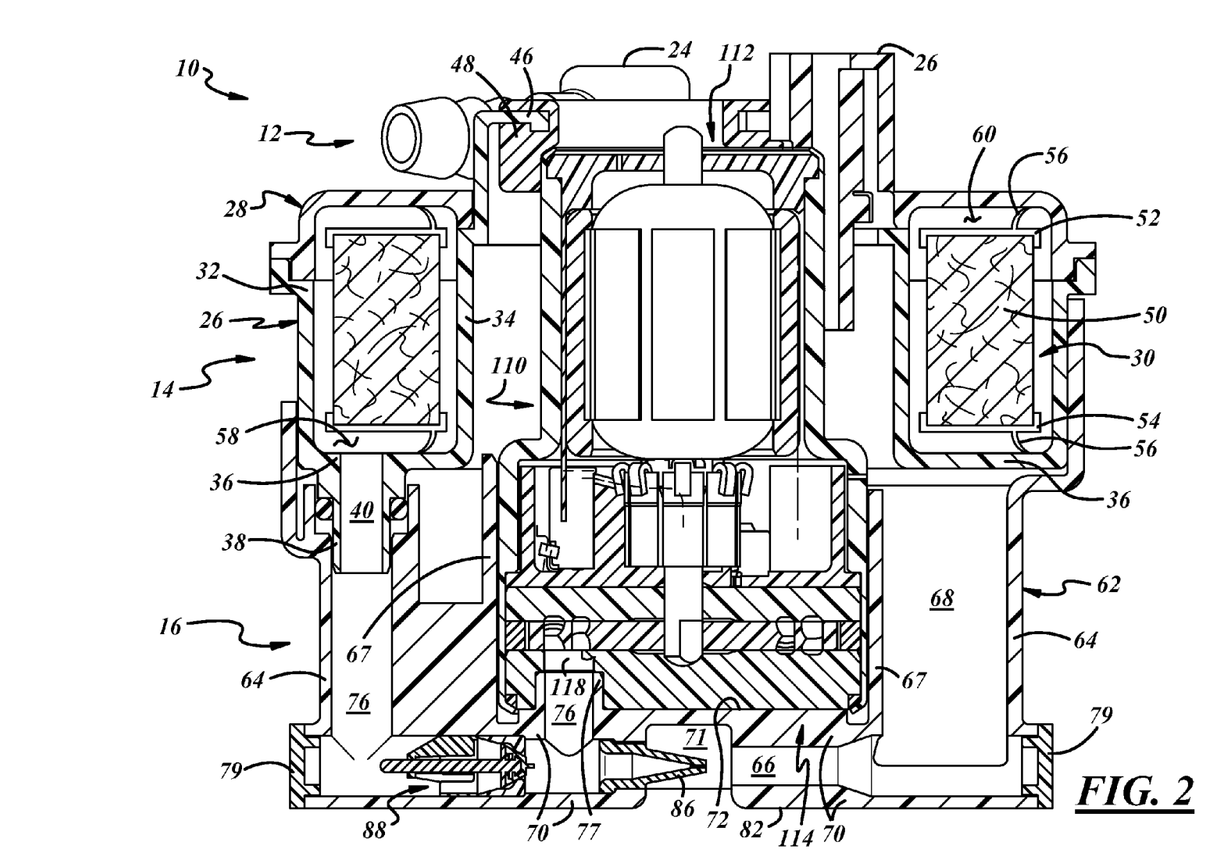
FIG. 2 is an axial cross-sectional view of the fuel pump module of FIG. 1, taken through an outlet of a fuel pump assembly.

Referring in more detail to the drawings, FIG. 1 illustrates a presently preferred form of a fuel pump module 10 for drawing fuel from within a fuel tank (not shown) and pressurizing and filtering the fuel for delivery to an engine (not shown). In general, the fuel pump module 10 as shown in FIG. 1 may include a mounting flange 12 for mounting to the fuel tank within an aperture thereof, a filter assembly 14 carried by the mounting flange 12 for filtering fuel, a reservoir assembly 16 carried by the filter assembly for holding a quantity of fuel, and a piezo electric level sensor 18 for measurement of fuel level or fuel quantity in the fuel tank. Other types of level sensors such as resistor card level sensors could also be used. Referring to FIG. 2, the fuel pump module 10 may also include a fuel pump assembly 110 carried by the reservoir assembly 16 for drawing fuel from the reservoir assembly 16 and pressurizing the fuel for delivery to the filter assembly 14 and downstream thereof. As will be described in detail below, the fuel pump assembly 110 may include an inlet and outlet porting arrangement that may reduce or eliminate hoses, hose routing, and hose interconnections, and a commutator arrangement that may facilitate commutator cooling and cleaning.

As best shown in FIG. 1, the mounting flange 12 may include a body 20, and a rim 22 surrounding the body 20 for engaging the fuel tank (not shown). The mounting flange 12 may also include a fuel outlet fitting 24 carried by the body 20 to connect to a fuel delivery conduit (not shown), and an electrical connector 26 carried by the body for connecting to another electrical connector (not shown).

Figure 3:
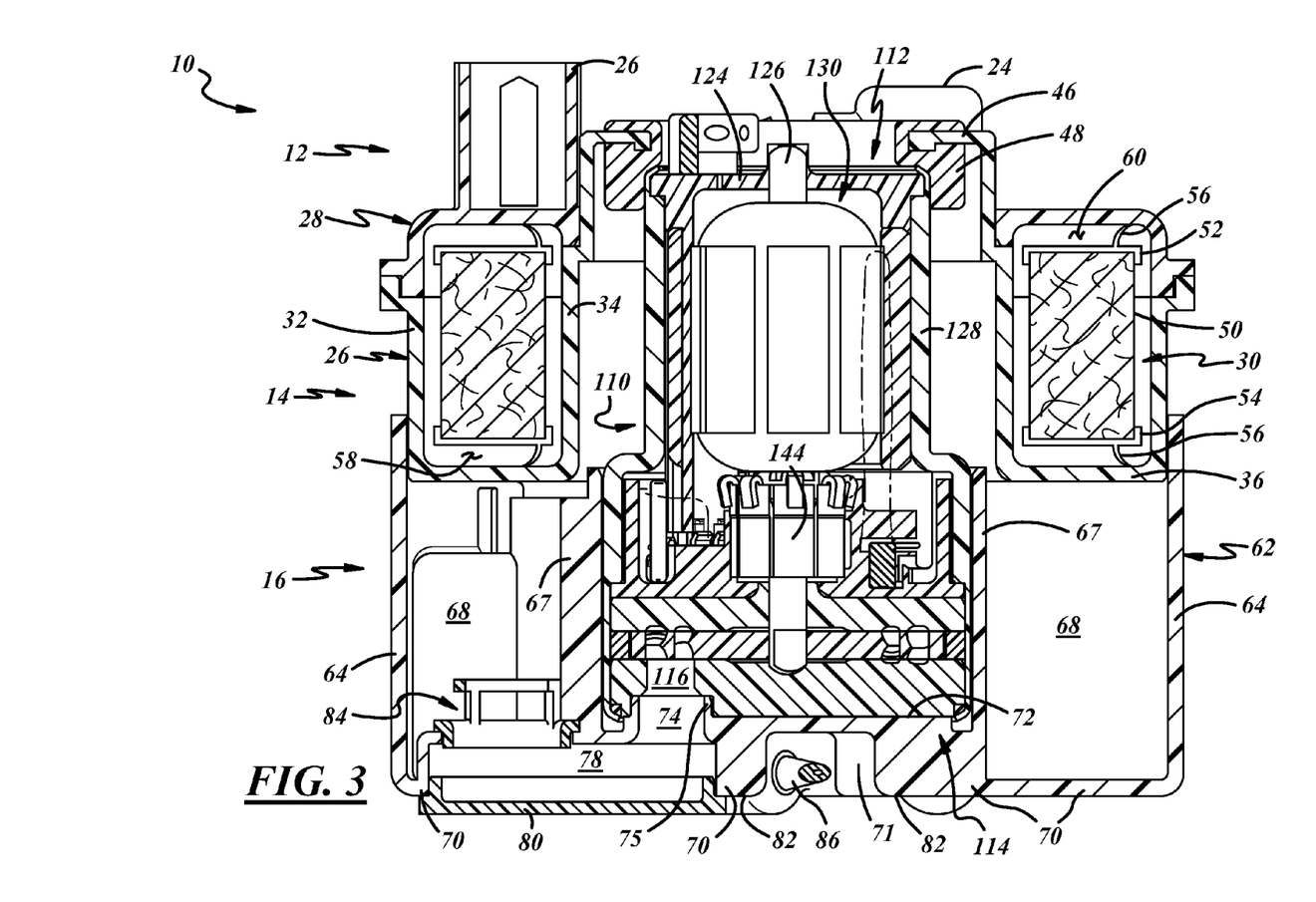
FIG. 3 is another axial cross-sectional view of the fuel pump module of FIG. 1, taken through an inlet of a fuel pump assembly.

Referring to FIGS. 2 and 3, the filter assembly 14 may include a filter housing 26 and a cover 28 carried by the filter housing 26 to define a filter chamber, and a filter 30 disposed in the filter chamber for filtering fuel. The filter housing 26 may also include an outer wall 32, an inner wall 34 disposed radially inwardly of the outer wall 32, and a bottom wall 36 extending between the inner and outer walls 34, 32. The filter housing 26 may further include a fuel inlet conduit 38 defining a fuel inlet 40, and a fuel outlet conduit (not shown) defining a fuel outlet (not shown). The inner wall 34 of the filter housing 26 may include a flange 46 that may carry a grommet 48, which may help support the fuel pump assembly 110.

The filter 30 may include a filter element 50 and opposed end caps 52, 54 supporting the filter element 50. For example, the end caps 52, 54 may include flexible seals 56 that sealingly engage corresponding inside surfaces of the filter housing 26 and cover 28. The seals 56 may be laterally or radially offset so as to at least partially define an inlet chamber 58 in direct communication with the fuel inlet 40 and the outside of the filter element 50, and an outlet chamber 60 isolated from and downstream of the inlet chamber 58 and in direct communication with the inside of the filter element 50 and the fuel outlet (not shown).

Still referring to FIGS. 2 and 3, the reservoir assembly 16 may include a reservoir 62 having an outer wall 64 and an inner wall 67 disposed radially inwardly of the outer wall 64, and a reservoir chamber 68 between the inner and outer walls 67, 64 that may hold, among other things, a quantity of fuel therein. The reservoir 62 may be composed of any material such as an acetal material, and may also include an end wall 70 connected to the inner and outer walls 67, 64, and an inlet passage 66 (FIG. 2) and an inlet pocket 71 adjacent to the end wall 70. The inner wall 67 and an inside bottom surface 72 disposed radially within the inner wall 67 may define a pump pocket configured to receive the fuel pump assembly 110 radially within the inner wall 67. The reservoir 62 may also include a fuel pump inlet passage 74 (FIG. 3) and outlet passage 76 (FIG. 2) both communicating with the pump pocket, and conduit projections 75 (FIG. 3), 77 (FIG. 2) that may define part of the fuel pump inlet and outlet passages 74 (FIG. 3), 76 (FIG. 2). As shown in FIG. 3, the reservoir 62 may further include a reservoir transfer passage 78 in the end wall 70 and in fluid communication between the reservoir chamber 68 and the fuel pump inlet passage 74. The inlet pocket 71 is disposed in the end wall 70 of the reservoir between the inside bottom surface 72 and an outside bottom surface 82, and in open communication with the outside bottom surface 82 to allow fuel to enter the inlet pocket 71.

Referring to FIGS. 2 and 3, the reservoir 62 may carry other components of the reservoir assembly 16. For example, the reservoir 62 may carry plugs 79, a cap 80 welded in place into the outside bottom surface 82 to cover an opening formed by a part of an injection molding die half (not shown) that forms the inlet port 74 and a screen opening, and a fuel screen 84 (FIG. 3) disposed radially between the inner and outer walls 67, 64 and between the reservoir chamber 68 and fuel pump inlet passage 74. The reservoir 62 may also carry a jet 86 to discharge fuel through the inlet passage 66 to create a pressure drop in the area of the inlet to entrain fuel from the fuel tank into the stream of fuel flowing through the inlet passage 66 (FIG. 2) and into the chamber 68.

Referring to FIGS. 2 and 3, the fuel pump assembly 110 may be any suitable electro-mechanical pumping device that pressurizes fuel for delivery to an upstream end of the filter assembly 14 and, ultimately, to an engine. The fuel pump assembly 110 may be centrally located with respect to the filter and reservoir assemblies 14, 16, and the filter and reservoir assemblies 14, 16 may generally circumscribe the fuel pump assembly 110. The fuel pump assembly 110 may include a motor end 112 and a pump end 114. A fuel inlet 116 (FIG. 3) and an outlet 118 (FIG. 2) both may be disposed substantially at the pump end 114 and may be adapted for communication with the inlet and outlet passages 74, 76 of the reservoir 62. Accordingly, in some implementations, fuel may be routed into and out of the pump module 10 without hoses, hose routing, and hose interconnections.

Figure 4:
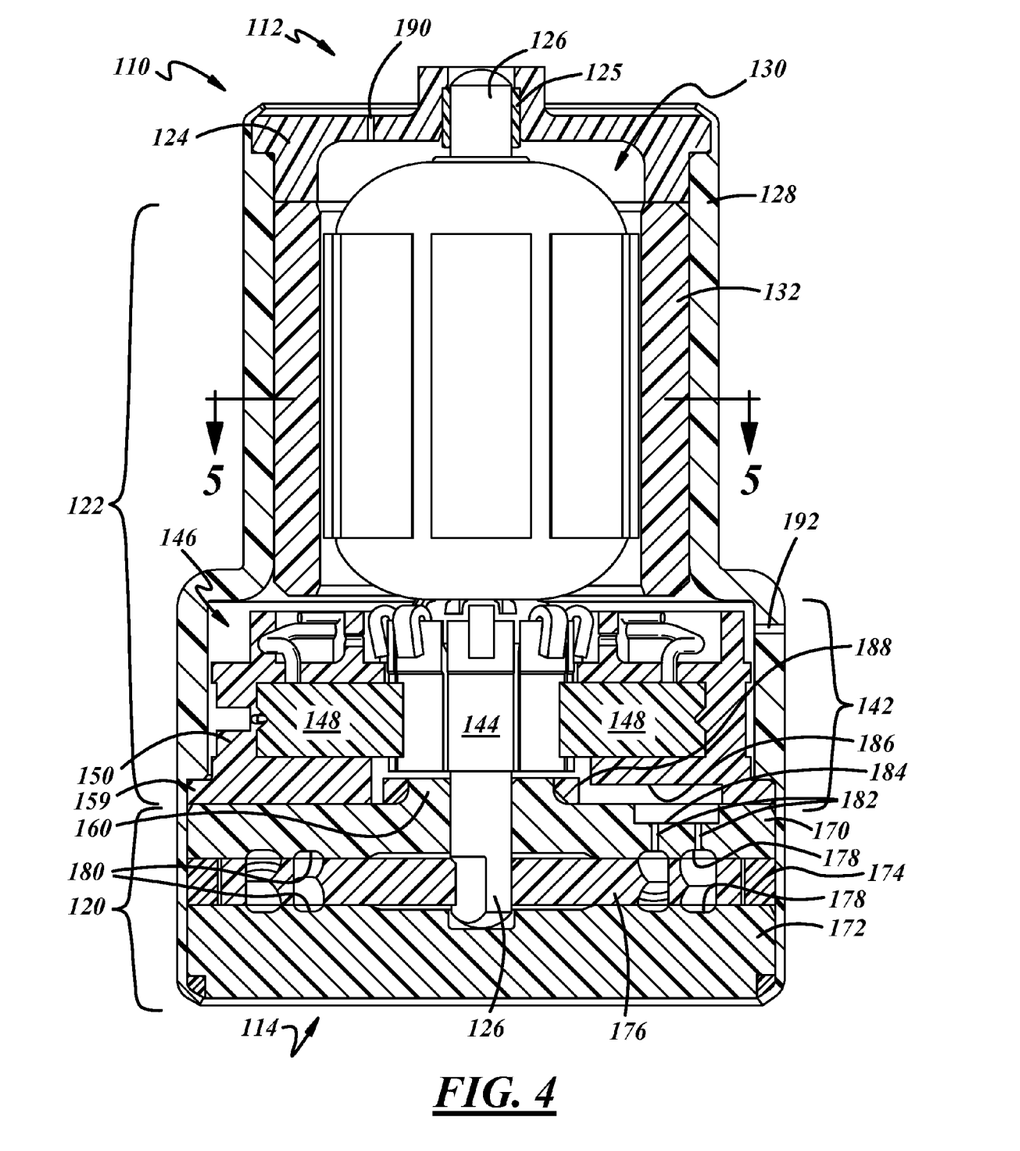
FIG. 4 is an axial cross-sectional view of the fuel pump assembly shown in FIGS. 2 and 3.

Referring to FIG. 4, the fuel pump assembly 110 may also include a fuel pump 120 disposed at the pump end 114, and an electric motor 122 disposed at the motor end 112 and axially between the fuel pump 120 and a motor cover 124 at the motor end 112. The motor 122 may be coupled to the fuel pump 120 via a drive shaft 126. The motor cover 124 may be composed of any material such as an acetal material, and may include a bronze bushing 125 for bearing support of an upper end of the drive shaft 126. The fuel pump 120, motor 122, and cover 124 may be carried inside a shell 128 extending axially along the assembly 110 and crimped or canned to the motor cover 124 and the fuel pump 120. The shell 128 may be composed of metal and may act as a flux tube for the motor 122.

Figure 5:
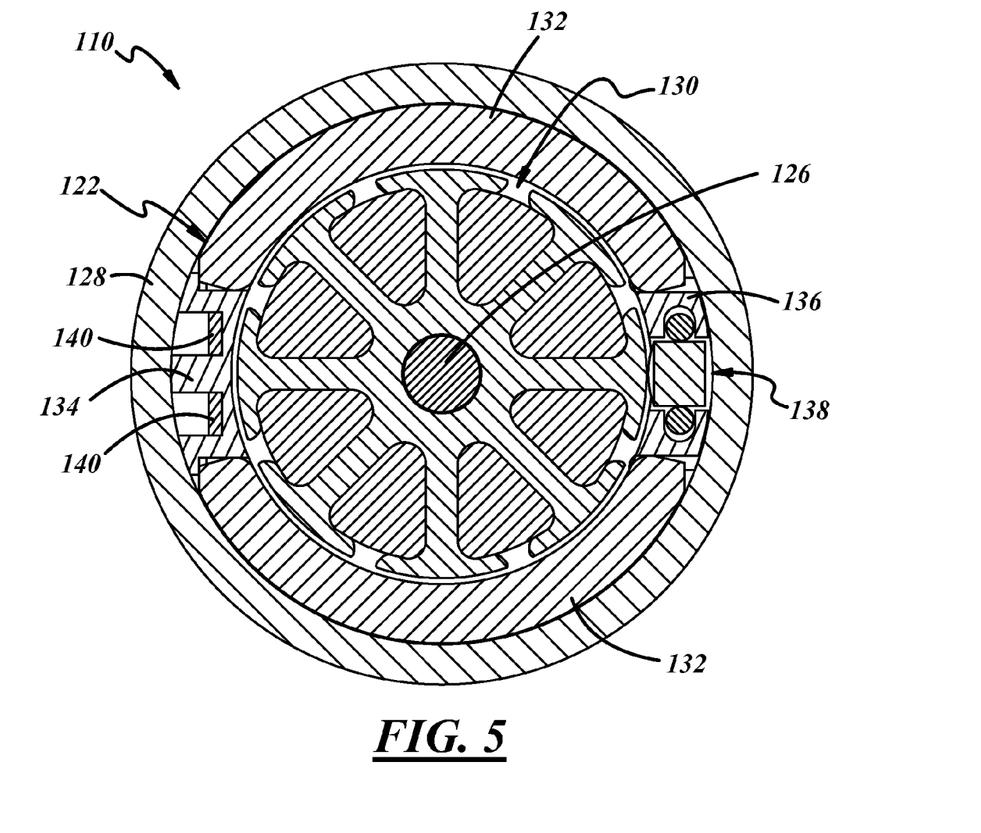
FIG. 5 is a transverse cross-sectional view of the fuel pump assembly shown in FIG. 4.

Referring also to FIG. 5, the motor 122 may include an armature 130 rotatably disposed within the shell 128. The armature 130 may carry the drive shaft 126 which may support the armature 130, drive the fuel pump 120, and generally define a longitudinal axis of the fuel pump assembly 110. The motor 122 may also include magnets 132 disposed between the armature 130 and the shell 128 and circumferentially spaced by legs 134, 136 of the motor cover 124. The motor 122 may additionally include a magnet clip 138 disposed circumferentially between the magnets 132 and carried by one leg 136 of the motor cover 124, and commutator leads 140 carried by the other leg 134 of the motor cover 124.

Referring to FIG. 4, the motor 122 may further include a commutator 142 axially disposed between the armature 130 and the fuel pump 120. This location may facilitate cooling and cleaning of the commutator 142 as will be further described herein below. The commutator 142 may be clocked relative to the armature 130 so as to advance timing, if desired. The commutator 142 may include a commutator rotor 144 adapted for rotation with the motor armature 130, and a brush holder assembly 146 adjacent to the commutator rotor 144. The commutator rotor 144 may be a copper or carbon, barrel-type of commutator rotor, by way of an example without limitation. The armature 130 may be non-overmolded or overmolded.

Figure 6:
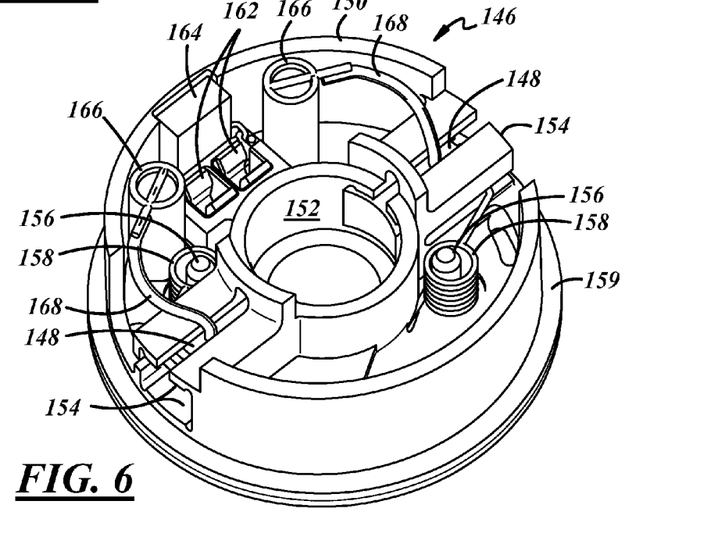
FIG. 6 is a perspective view of a brush holder assembly of the fuel pump assembly of FIG. 4.

Referring now to FIG. 6, the brush holder assembly 146 may carry commutator brushes 148 for contacting the commutator rotor 144, and may facilitate communication of electricity to the brushes 148. The brush holder assembly 146 may include a housing 150 defining a pocket 152 in which a portion of the commutator 144 may be received, brush guides 154 for carrying the brushes 148, and spring posts 156 for carrying torsional springs 158 that urge the brushes 148 into contact with the commutator 144. The housing 150 may be molded, machined or otherwise formed from a polyphenylenesulfide (PPS) or other suitable material. The housing 150 may be axially restrained between the fuel pump 120 and an internal shoulder of the shell 128, and may be radially positioned by a hub 160 of the pump 120. The housing 150 may also include an outwardly extending flange 159 overlaid by a radially extending shoulder of the shell 128. An insulator (not shown) may be provided axially between the hub 160 and the commutator rotor 144 to prevent electrical shorting therebetween. The brushes 148 may be modified to reduce the surface area of contact with the commutator rotor 144 and/or change the contact angle therebetween. The brush holder assembly 146 may also include electrical contacts 162 for receiving the commutator leads 140, and a radio frequency interference (RFI) circuit. The RFI circuit may include a capacitor 164 and coils 166 in electrical communication between the contacts 162 and the brushes 148 for modulating electricity supplied to the brushes 148, and shunt wires 168 communicating electricity from the capacitor and coils 164, 166 to the brushes 148.

Referring to FIG. 4, the fuel pump 120 may be any type of fuel pump and, for example, may be an automotive fuel pump of relatively large diameter compared to diameters of conventional automotive fuel pumps. The outside diameter may be greater than 40 mm and, may, in at least some implementations, be greater than 45 mm. An exemplary diameter may be about 50 mm. The relatively large diameter enables the pump output to be on the order of about 120 lph @ about 400 kPa, while being operated at relatively low speed such as less than about 5,500 RPM (at about 13 Volts) and, preferably less than about 5,000 RPM at about 13 V. An exemplary speed is about 4,500 RPM at about 13 V.

As best shown in FIG. 4, the fuel pump 120 may include a first end cap 170 that carries the hub 160, may be disposed axially adjacent the commutator 142, and may radially support the motor drive shaft 126. The fuel pump 120 may also include a second end cap 172 axially positioning and supporting the motor drive shaft 126, a spacer ring 174 disposed axially therebetween to define a pump chamber, and a pumping element 176 disposed in the pump chamber axially between the end caps 170, 172 and radially within the spacer ring 174. The pumping element 176 is coupled to the drive shaft 126 of the motor 122 for rotation therewith for pressurizing the fuel. The pumping element 176 may be a dual-channel, single-stage impeller, or any other type of pumping element. The end caps 170, 172 may include radially outer and inner pumping channels 178, 180 in the case of a dual channel pump arrangement.

The pumping channels 178, 180 may be relatively shallow to facilitate a relatively lower flow rate at low speeds, while corresponding vanes, pockets or other features of the pumping element 176 may be of conventional design. For example, the width of the outer channels 178 may be on the order of about 3.00 mm with a depth of about 0.74 mm and a radius of about 1.30 mm. In other words, the outer channels 178 have a width-to-depth aspect ratio on the order of about 4:1, in comparison to conventional outer channels, which typically have an aspect ratio of about 3:1. In another example, the width of the inner channels 180 may be on the order of about 2.50 mm with a depth of about 0.65 mm and a radius of about 1.05 mm. In other words, the inner channels 180 have a width-to-depth aspect ratio on the order of about 4:1, in comparison to conventional inner channels, which typically have an aspect ratio of about 3:1. Overall, the channels 178, 180 may have a width-to-depth aspect ratio of between about 3.5:1 to about 4.5:1.

The second end cap 172 may include the fuel inlet and outlet 116, 118 in communication with the pumping channels 178, 180, such that fuel is drawn into and discharged from the fuel pump assembly 110 substantially at the pump end 114 thereof. Although the inlet and outlet 116, 118 are shown extending through the second end cap 172 and in a longitudinal direction, it is also contemplated that inlet(s) and outlet(s) could also or instead be oriented and positioned in any other suitable manner substantially at the pump end 114 of the fuel pump assembly 110. For example, the fuel pump assembly 110 could be a side discharge type of unit, wherein an outlet discharges through the side of the fuel pump assembly 110 at the pump end 114 thereof. An exemplary fuel pump of this type is disclosed in U.S. Pat. No. 6,231,318, which is assigned to the assignee hereof and is incorporated herein by reference in its entirety.

As shown in FIGS. 2 and 3, locating the inlet 116 (FIG. 3) and the outlet 118 (FIG. 2) at one end of the fuel pump assembly 110 enables the assembly 110 to be plugged into or carried by the reservoir 62, thereby minimizing or avoiding use of related hoses, hose routing, and hose interconnections. The inlets and outlets 116, 118 may include counterbores into which the conduit projections 75, 77 of the reservoir 62 fit when the fuel pump assembly 110 is assembled to the reservoir 62. The projections 75, 77 may be interference fit into the inlet and outlet 116, 118, and circumferential seals (not shown) may also or instead be used therebetween. The pump end 114 of the fuel pump assembly 110 may be carried within the pump pocket of the reservoir 62, and the motor end 112 of the fuel pump assembly 110 may be supported by the grommet 48 carried by the filter housing 26.

In operation, and referring to FIGS. 3 and 4, electricity may be provided to the motor 122 (FIG. 4) from any suitable source to power the motor 122 and, thus, drive the fuel pump 120 (FIG. 4). While driven, the fuel pump 120 draws fuel from the reservoir chamber 68 of the reservoir assembly 16 through the fuel screen 84, the fuel inlet 116 and into the pump chamber, pressurizes the fuel with the rotating pumping element 176, and discharges the pressurized fuel from the pump chamber through the fuel outlet 118.

Referring to FIG. 2, the fuel flows under pressure into the reservoir outlet passage 76, and through the jet 86. The jet 86 may extend into the inlet pocket 71 in the end wall 70 of the reservoir 62 that is in communication with the reservoir inlet passage 66. The fuel flow through the jet 86 and into the reservoir inlet passage 66 tends to draw fuel from outside of the reservoir assembly 16 into the inlet pocket 71 and inlet passage 66. Accordingly, the jet pump 86 and the pump outlet 118 are located relatively adjacent one another at the bottom of the fuel pump module 10. The fuel discharged from the fuel pump 120 (FIG. 4) also flows under pressure through the check valve 88, out of the reservoir outlet passage 76, and into the filter assembly 14 through its inlet 40, which sealingly fits into the reservoir outlet passage 76.

Still referring to FIG. 2, the filter assembly 14 receives the incoming fuel through its inlet 40 routes the fuel through the filter element 50 and to the filter housing fuel outlet (not shown). The pressurized fuel flows into the filter inlet chamber in contact with the upstream side of the filter 30, through the filter element 50, and out of the filter element 50 at the downstream side of the filter 30 into the outlet chamber. The filtered and pressurized fuel then flows out of the filter assembly through the fuel outlet. Any fuel not used by the engine is spilled back into the reservoir 62 by a bypass pressure regulator valve (not shown). The bypass pressure regulator valve can be part of the filter assembly 14 or it can be in any other suitable location.

Locating the pump inlet and outlet 116, 118 substantially at the pump end 114 of the fuel pump assembly 110 eliminates substantial flow of fuel through the portion of the shell 128 in which the motor 122 resides. This construction thus reduces resistance to turning of the motor 122 to reduce windage losses and heating of the fuel. It is, however, contemplated that some fuel may leak or otherwise flow into the motor chamber, such as along the drive shaft 126 or through vapor purge porting.

As best shown in FIG. 4, the vapor purge porting communicates vapor from the pump chamber to outside of the fuel pump assembly 110. Some fuel vapor may flow from the pumping channels 178, 180 in the first end cap 170 of the pump 120 through vapor purge passages 182, which generally axially extend through the first end cap 170 into a vapor purge pocket 184 formed therein. In turn, the fuel vapor may flow from the purge pocket 184, through a vapor purge channel 186 in the bottom of the brush holder 150, and into a vapor purge passage 188 in the brush holder 140 adjacent the brush-commutator interface. Accordingly, the fuel vapor may cool and clean the commutator 142 before exiting this portion of the fuel pump assembly 110, such as through a vent in the side of the shell 128 at a location axially between the brushes 148 and the armature 130.

Also or instead, the fuel vapor may flow into the motor chamber to cool the motor 122. Any liquid fuel in the motor chamber tends to be vaporized by the rotating armature 130. A vent 190 may be provided in the motor cover 124 to permit fuel vapor to escape to substantially atmospheric pressure within the fuel tank (not shown). Some of the fuel vapor may condense and drain back into the fuel tank through one or more small channels (not shown) provided between the shell 128 and the pump 120. For example, such channels could be provided in any suitable location, such as between the outer diameters of the pump 120 and the inner diameter of the shell 128.

Accordingly, in normal operation, the motor chamber is preferably not completely filled with liquid fuel and the centrifugal force imparted to any vaporous or liquid fuel by the spinning armature 130 moves the fuel generally radially outwardly. This provides a vapor barrier adjacent the motor 122 as the heavier liquid fuel is forced outwardly away from the motor 122 within the shell 128. It is also presently believed that the vapor barrier surrounding the motor 122 further reduces the resistance to rotation of the motor 122 which decreases the electric current draw of the motor 122 and increases the efficiency of the fuel pump assembly 110. Also, the reduced pressure in the motor chamber is believed to increase the amount of fuel vapor in the motor chamber, reducing resistance to rotation of the motor 122.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A fuel pump assembly, comprising:
   a housing having generally opposed ends;
   a fuel pump adjacent one end of the housing and having a pump chamber, a fuel pumping element disposed in the pump chamber, a fuel inlet adjacent the one end of the housing and communicating with the pump chamber, a fuel outlet communicating with the pump chamber downstream of the fuel inlet and configured to supply fuel under pressure to an engine, and at least one vapor purge passage separate from the fuel outlet, and communicating with the pump chamber downstream of the fuel inlet, upstream of the fuel outlet and between the fuel inlet and the fuel outlet; and
   an electric motor adjacent the other end of the housing for rotatably driving the fuel pumping element, including:
      a motor armature with one end adjacent the fuel pumping element and a generally opposed other end adjacent the other end of the housing;
      a commutator adjacent the one end of the housing and positioned between the one end of the motor armature and the fuel pumping element; and
      a brush holder housing with commutator brushes contacting the commutator;
   the fuel outlet routing the fuel under pressure away from and not in contact with the commutator, brushes and armature of the electric motor; and
   the vapor purge passage communicating with the commutator, brushes and armature to supply pressurized fuel vapor from the pump chamber to the rotating armature, commutator and brushes to cool them and decrease viscosity drag on the rotating armature and commutator.

2. The assembly of claim 1, wherein the fuel outlet of the fuel pump is disposed substantially at the one end of the housing.

3. The assembly of claim 2, wherein the fuel pump further includes:
   a first end cap of the pump adjacent one end of the commutator;
   a second end cap of the pump adjacent the one end of the housing and including the fuel inlet and fuel outlet; and
   the pumping element is disposed in the pump chamber between the end caps of the pump.

4. The assembly of claim 3, wherein at least one of the pump end caps includes at least one pump channel having a width-to-depth aspect ratio of about 3.5 to about 4.5.

5. A fuel pump assembly, comprising:
   a fuel pump having a pump chamber, a pumping element disposed in the pump chamber, a fuel inlet communicating with the pump chamber, a fuel outlet communicating with the pump chamber downstream of the fuel inlet and configured to supply fuel under pressure to an engine, and at least one vapor purge passage separate from the fuel outlet and communicating with the pump chamber downstream of the fuel inlet, upstream of the fuel outlet and between the fuel inlet and the fuel outlet; and
   an electric motor for rotatably driving the fuel pump, including:
      a motor armature;
      a commutator rotor positioned between the motor armature and the pumping element of the fuel pump;
      a brush holder assembly with a plurality of commutator brushes adapted for contact with a commutator rotor; and a housing carrying the commutator brushes and including a bottom surface and a vapor purge channel disposed therein and in fluid communication with the at least one vapor purge passage;

the fuel outlet routing the fuel under pressure away from and out of contact with the commutator, brushes and armature of the electric motor; and the vapor purge passage communicating with the commutator, brushes and motor armature to supply pressurized fuel vapor from the pump chamber to the commutator, brushes and the motor armature to cool them and to decrease viscosity drag on the rotating armature and commutator.

6. The assembly of claim 5, wherein the brush holder housing further includes a substantially axially extending vapor purge passage in fluid communication with the vapor purge channel and an interface between the brushes and the rotor.

7. The assembly of claim 1, further comprising a shell for housing the motor and including a vapor vent extending therethrough.

8. The assembly of claim 7, wherein the commutator includes commutator brushes, and wherein the vapor vent is located axially between the brushes and the motor armature.

9. The assembly of claim 1, further comprising a shell for housing the motor and a motor cover carried by the shell and including a vapor vent therethrough.

10. The assembly of claim 1, further comprising a fuel reservoir including a pump pocket configured to receive at least in part the fuel pump and at least partially defined by an inside bottom surface, and a fuel pump inlet passage and a fuel pump outlet passage disposed in the inside bottom surface and communicating with the fuel pump inlet and outlet respectively.

11. The assembly of claim 10, further comprising an outer wall, an inner wall disposed radially inwardly of the outer wall wherein the pump pocket is defined radially within the inner wall, an end wall connected to the inner and outer walls, and a fuel reservoir chamber between the inner and outer walls.

12. The assembly of claim 11, further comprising:

an inlet pocket disposed in the end wall between the inside bottom surface and an outside bottom surface of the end wall and in open communication with the outside bottom surface to allow fuel to enter the inlet pocket; and a reservoir fuel inlet passage disposed in the end wall and in fluid communication with the inlet pocket and the reservoir chamber.

13. The assembly of claim 12, further comprising:

a reservoir fuel outlet passage disposed in the end wall and carrying a jet in fluid communication with the inlet pocket and directed toward the reservoir inlet passage.

14. The assembly of claim 13, further comprising a check valve disposed in the reservoir outlet passage.

15. The assembly of claim 11, further comprising a reservoir transfer passage in the end wall and in fluid communication between the reservoir chamber and the fuel pump inlet passage.

16. The assembly of claim 15, further comprising a fuel screen carried by the reservoir and in fluid communication between the reservoir transfer passage and the reservoir chamber.

17. A fuel pump module, comprising:

a fuel pump assembly with generally opposed ends and including an electric motor and a fuel pump including an inlet and an outlet for pressurized fuel in a pump end of the fuel pump assembly;

the fuel pump is adjacent one of the opposed ends of the assembly and the electric motor is adjacent the other of the opposed ends of the assembly;

an armature of the electric motor with one end adjacent the fuel pump and an other generally opposed end adjacent the other end of the assembly and a commutator and brushes between the fuel pump and the one end of the armature adjacent the fuel pump;

a vapor purge port of the fuel pump separate from and upstream of the outlet for pressurized fuel of the fuel pump, downstream of the inlet of the fuel pump and communicating with the commutator and brushes to supply a flow of pressurized fuel vapor to the rotating armature, the commutator and the brushes to cool them and reduce viscous drag on the rotating armature and commutator;

the outlet of the fuel pump routing pressurized fuel away from and out of contact with the electric motor armature, commutator and brushes;

a module mounting flange configured for attachment to a fuel tank for mounting the fuel pump assembly in the fuel tank;

a fuel filter carried by the mounting flange, and including an annular filter element, and an annular housing defining a filter chamber containing the filter element and encircling the fuel pump assembly; and a fuel reservoir assembly carried by the annular housing, encircling the fuel pump assembly and including a pocket for receiving the pump end of the fuel pump assembly.

18. The fuel pump module of claim 17, wherein the fuel reservoir assembly includes a fuel pump inlet passage in fluid communication with the inlet of the fuel pump, a fuel pump outlet passage in fluid communication with the outlet of the fuel pump, a reservoir inlet, a reservoir chamber in fluid communication with the reservoir inlet and with the inlet of the fuel pump, and an outlet passage in fluid communication with the outlet of the fuel pump and with an inlet of the fuel filter housing.

* * * * *